Jan. 22, 1924.

J. P. BIVENS 1,481,280

SWITCH MOUNTING FOR MACHINES HAVING INDIVIDUAL MOTORS

Filed Dec. 8, 1922  2 Sheets-Sheet 1

WITNESSES

INVENTOR
JOE P. BIVENS,

BY

ATTORNEYS

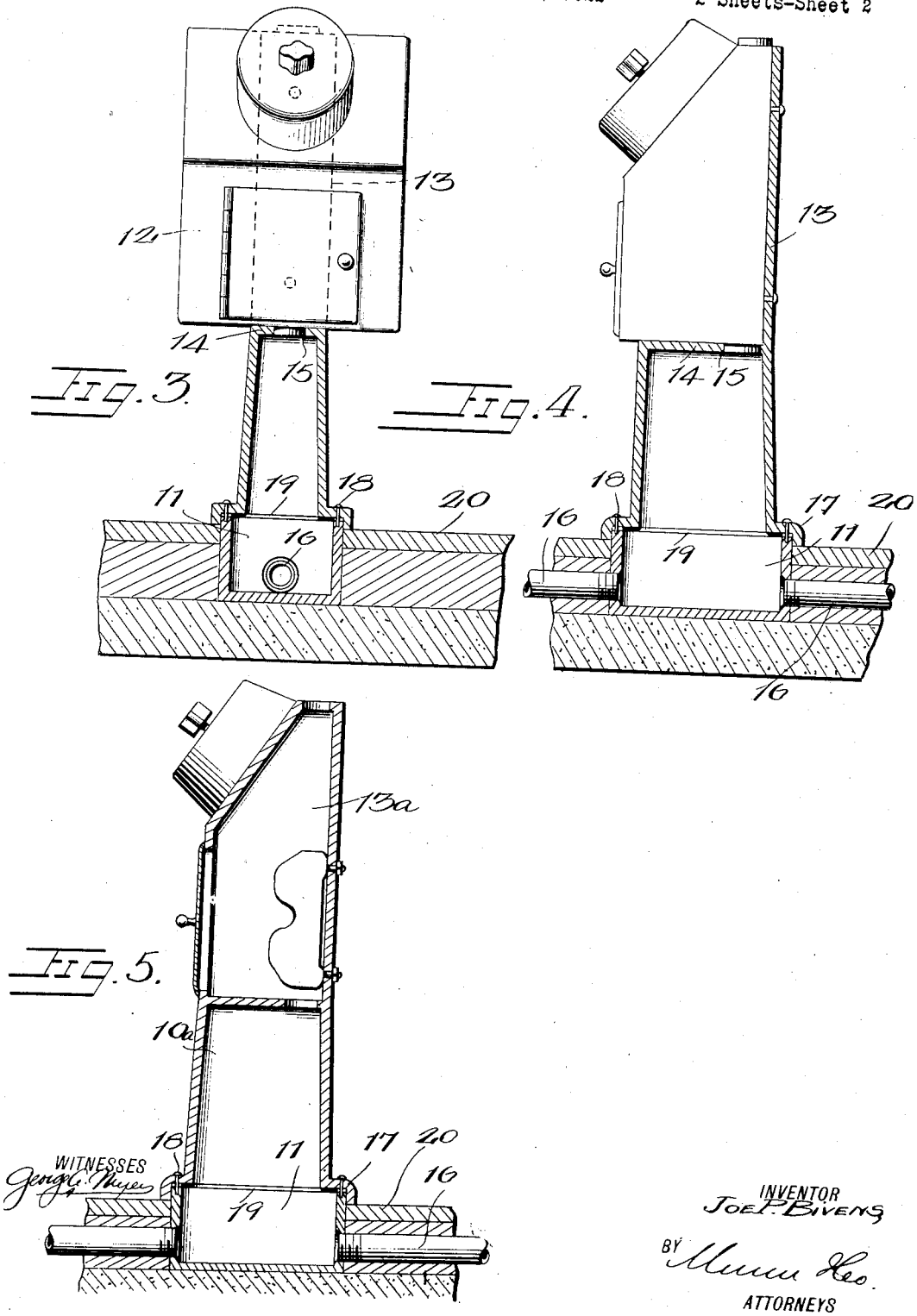

Patented Jan. 22, 1924.

1,481,280

UNITED STATES PATENT OFFICE.

JOE P. BIVENS, OF GASTONIA, NORTH CAROLINA, ASSIGNOR TO MICHAEL AND BIVENS INCORPORATED, OF GASTONIA, NORTH CAROLINA, A CORPORATION OF NORTH CAROLINA.

SWITCH MOUNTING FOR MACHINES HAVING INDIVIDUAL MOTORS.

Application filed December 8, 1922. Serial No. 605,691.

*To all whom it may concern:*

Be it known that I, JOE P. BIVENS, a citizen of the United States, and a resident of Gastonia, in the county of Gaston and State of North Carolina, have invented certain new and useful Improvements in Switch Mountings for Machines Having Individual Motors, of which the following is a specification.

My present invention relates generally to switch mountings for machines having individual motors, and more particularly to switch supports upstanding from the floor or other supporting surface of looms, knitting machines and the like, excessive vibration of which in use precludes the mounting of the switch upon the machine itself.

It is a well known fact that the above has given rise to unnecessarily expensive switch installations as well as those which are unsatisfactory from the standpoint of ready accessibility in case repair or substitution is required, and my invention among other things seeks to provide an arrangement which will avoid these difficulties and disadvantages.

As now employed switch installations commonly include a junction box mounted in the floor or other supporting surface adjacent to each machine, with a conduit leading upwardly from the junction box and through a reinforcing pedestal secured to the floor or supporting surface, the switch box being secured to the upper end of the conduit.

My invention proposes an arrangement in which the switch is supported upon a stand the latter of which forms the cover of the junction box and admits of the extension of wires upwardly from the junction box without the necessity of any wire protection or conduit within the stand, the stand having means whereby a weather-proof connection may be readily formed between the same and the junction box so that the upper portion of the latter may be exposed at the surface of the floor and thus provide for ready accessiblity to the wiring by simply disconnecting the stand as a whole with its switch from the junction box.

My invention is susceptible of various forms of which certain are illustrated in the accompanying drawings, which form a part of this specification and wherein—

Figures 3 and 4 are respectively a transverse and longitudinal section through the arrangement shown in Figures 1 and 2.

Figure 5 is a longitudinal section showing a modified construction.

Figures 1, 2:
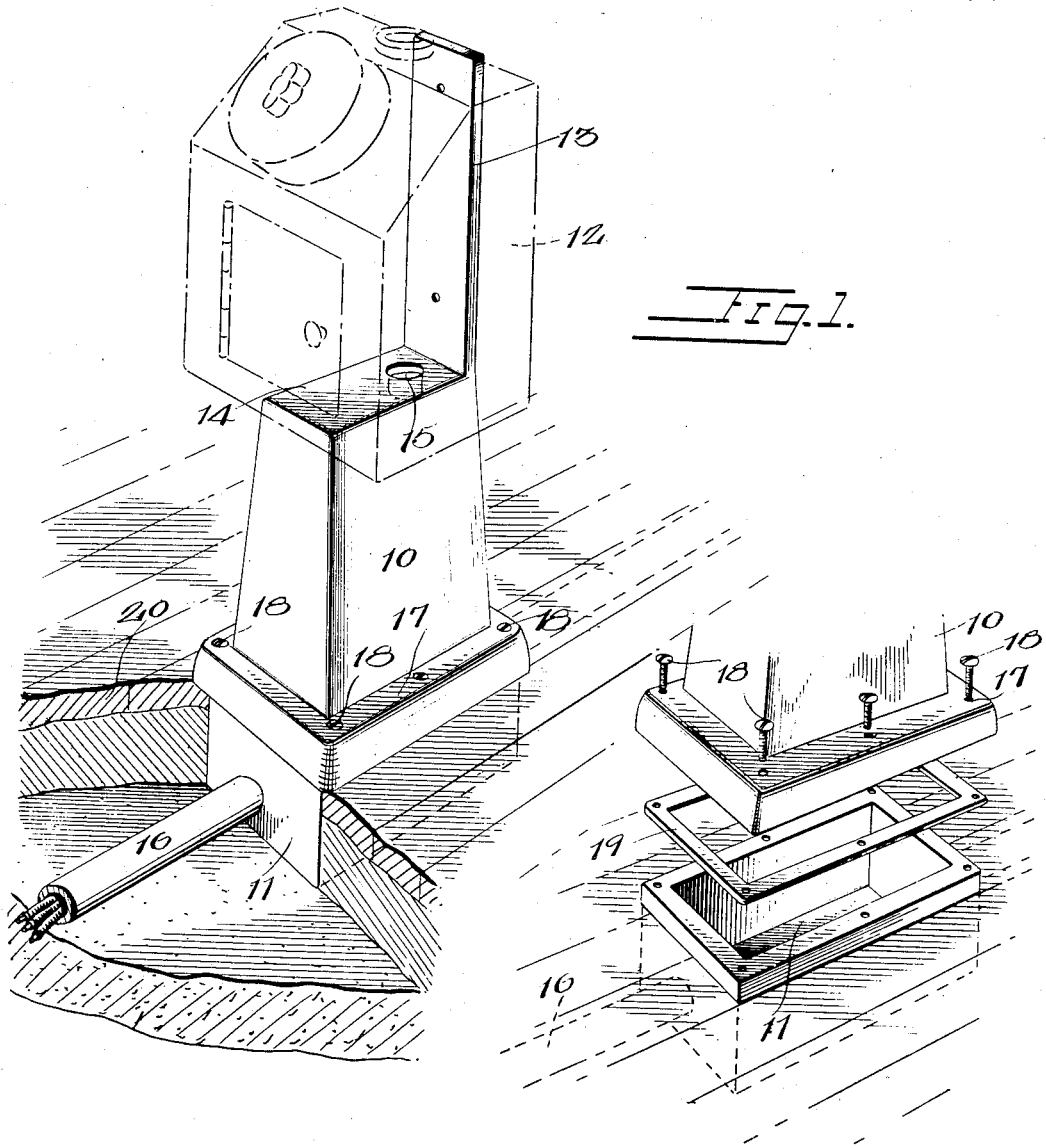
Figure 1 is perspective view illustrating one form of switch mounting as proposed by my invention.
Figure 2 is perspective view of the junction box, packing ring and support base in detached relation.

Referring now to these drawings and particularly to Figures 1 to 4 inclusive my invention proposes a switch stand having an upright hollow body 10, which may taper slightly as shown, and which may be either square, circular or oblong in horizontal section depending upon the shape of the junction box indicated at 11, with which it is to be utilized. This supporting stand 10 is adapted to receive a switch box 12 thereon, which switch box may be of any suitable or conventional structure and held either by connection to the top of the stand or to an upright rear bracket 13 upstanding from the rear portion of the stand as particularly seen in Figures 1 and 4, the top 14 of the stand being closed except for an opening 15 upwardly through which wires may be extended from the junction box 11.

Wires lead to the junction box 11 in use through conduits 16 and, by virtue of the fact that the lower end of the supporting stand 10 has a flanged ring 17 adapted to seat upon and around the upper edge of the junction box 11 and capable of connection therewith as by means of screws 18 with an interposed packing ring 19 such as seen in Figures 2, 3 and 4, it is obvious that a weatherproof joint is thus effected which in turn not only permits of the seating of the junction box 11 within a supporting floor and the like 20 with its upper edge flush with or projecting slightly above the floor, but also permits of the extension of wires upwardly from the junction box and through the supporting stand to the switch box without the necessity of additional conduits or other wire protecting or weather-proofing features within the stand. The above advantages naturally flow from the fact that the supporting stand is adapted to be secured in weather-proof relation upon a junction box and forms the cover for the box and this structure brings about further advantages including easy installation in the first instance and ready accessibility thereafter in case repair or substitution becomes necessary. It is obvious that by avoiding the necessity of a vertical conduit for the wires within the supporting stand, considerable labor and expense is avoided and it becomes an easy matter to expose the wire connections within the junction box by simply unscrewing and removing the supporting stand as a whole with its switch from the junction box.

In Figure 5 I have shown a modified structure in which a switch box 13$^a$ is formed integral with and upstands from the hollow supporting stand 10$^a$, the latter being in other respects similar to the supporting stand 10 of Figures 1 to 4 inclusive and being adapted in a like manner to form a cover for the junction box 11 and to be secured to the latter in weather-proof relation by virtue of its flanged base ring 17 with an interposed packing ring 19.

I claim:

1. The combination of a supporting floor, a junction box embedded in said floor and having an upper open end substantially flush with the floor surface, and a cover for said box having provision for weather proof connection with the box and having an integral upright hollow body in free open communication with the box, said hollow body having an upper switch supporting surface disposed at a substantial distance above the floor level and perforated, and an integral upstanding switch anchoring extension rising from said hollow body.

2. As a new article of manufacture, a switch supporting cover for junction boxes consisting of an upright hollow body open at one end and having an apertured outstanding flange around its said open end, the opposite end having a switch supporting surface and an integral upstanding switch anchoring extension, as and for the purposes set forth.

JOE P. BIVENS.